US012807366B2

(12) United States Patent
Nowak

(10) Patent No.: US 12,807,366 B2
(45) Date of Patent: Nov. 24, 2026

(54) TRAY WITH MULTIPLE COMPARTMENTS

(71) Applicant: Graphic Packaging International, LLC, Atlanta, GA (US)

(72) Inventor: Lee Nowak, Leicestershire (GB)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

(21) Appl. No.: 19/175,177

(22) Filed: Apr. 10, 2025

(65) Prior Publication Data

US 2025/0320021 A1 Oct. 16, 2025

Related U.S. Application Data

(60) Provisional application No. 63/632,652, filed on Apr. 11, 2024.

(51) Int. Cl.
*B65D 5/4805* (2006.01)
*B31B 50/26* (2017.01)
(Continued)

(52) U.S. Cl.
CPC ........ *B65D 5/48022* (2013.01); *B31B 50/262* (2017.08); *B65D 5/2047* (2013.01);
(Continued)

(58) Field of Classification Search
CPC .... B65D 5/48022; B65D 5/4802; B65D 5/48; B65D 5/20; B65D 5/2038; B65D 5/2047; B65D 5/563; B65D 5/56
See application file for complete search history.

(56) References Cited

U.S. PATENT DOCUMENTS

| | | | |
|---|---|---|---|
| 2,110,681 | A | 3/1938 | Rutledge |
| 2,334,805 | A | 11/1943 | Barbieri |

(Continued)

FOREIGN PATENT DOCUMENTS

| | | | |
|---|---|---|---|
| CA | 2814149 | A1 | 4/2012 |
| CA | 2988665 | C | 6/2020 |

(Continued)

OTHER PUBLICATIONS

International Search Report and Written Opinion for PCT/US2025/024006 dated Jul. 22, 2025.

(Continued)

*Primary Examiner* — Javier A Pagan
(74) *Attorney, Agent, or Firm* — Andrew N. Claerbout; FisherBroyles, LLP

(57) ABSTRACT

A tray for holding one or more food products includes an upper construct, the upper construct including a plurality of panels having a flange panel and a plurality of upper side panels extending from the flange panel, and a lower construct, the lower construct including a plurality of panels, the plurality of panels of the lower construct including at least one bottom panel and a plurality of lower side panels forming a sidewall extending at least partially around an interior of the tray, the plurality of upper side panels of the upper construct are positioned in at least partial face-to-face contact with a respective lower side panel of the plurality of lower side panels of the lower construct, the plurality of panels of the lower construct further including a divider panel at least partially forming a divider wall forming a plurality of compartments in the interior of the tray.

31 Claims, 7 Drawing Sheets

(51) Int. Cl.
*B65D 5/20* (2006.01)
*B65D 5/56* (2006.01)
*B31B 110/10* (2017.01)
*B31B 120/40* (2017.01)

(52) U.S. Cl.
CPC .......... *B65D 5/563* (2013.01); *B31B 2110/10* (2017.08); *B31B 2120/404* (2017.08); *B31B 2120/406* (2017.08)

(56) References Cited

U.S. PATENT DOCUMENTS

| | | | | |
|---|---|---|---|---|
| 2,663,449 | A | 12/1953 | Smart | |
| 3,100,595 | A | 8/1963 | Curtiss | |
| 3,104,012 | A | 9/1963 | Beamish | |
| 3,154,215 | A | 10/1964 | Vesconte | |
| 3,224,163 | A | 12/1965 | Ray, II | |
| 3,358,900 | A | 12/1967 | Perdue | |
| 3,401,498 | A | 9/1968 | Garvin | |
| 3,489,331 | A | 1/1970 | Andersson | |
| D219,263 | S | 11/1970 | Castelli | |
| 3,575,338 | A | 4/1971 | Dilot | |
| 3,640,188 | A | 2/1972 | Dilot | |
| D224,662 | S | 8/1972 | Swett | |
| 3,823,054 | A | 7/1974 | Balzer | |
| D232,302 | S | 8/1974 | Lazure | |
| 3,863,832 | A | 2/1975 | Gordon et al. | |
| 3,893,882 | A | 7/1975 | Repenning | |
| 3,941,301 | A | 3/1976 | Jorgensen | |
| 4,046,310 | A | 9/1977 | Gustafsson | |
| 4,057,380 | A | 11/1977 | Hosoe | |
| 4,081,125 | A | 3/1978 | Meyers | |
| 4,130,236 | A | 12/1978 | Manizza | |
| D251,951 | S | 5/1979 | Florian | |
| 4,177,715 | A | 12/1979 | Meyers | |
| 4,202,465 | A | 5/1980 | Mclaren | |
| D257,109 | S | 9/1980 | Conti | |
| 4,241,863 | A | 12/1980 | Faller | |
| 4,257,530 | A | 3/1981 | Faller | |
| 4,279,354 | A | 7/1981 | Conti | |
| 4,283,427 | A | 8/1981 | Winters | |
| 4,305,542 | A | 12/1981 | Benzschawel | |
| 4,308,985 | A | 1/1982 | Manizza | |
| 4,325,905 | A | 4/1982 | Takahashi | |
| 4,351,473 | A | 9/1982 | Manizza | |
| 4,533,065 | A | 8/1985 | Chazal | |
| 4,555,381 | A | 11/1985 | Chazal | |
| 4,574,174 | A | 3/1986 | Mcgonigle | |
| D284,727 | S | 7/1986 | Gerber | |
| 4,718,596 | A | 1/1988 | Berthold | |
| D302,068 | S | 7/1989 | Forbes, Jr. | |
| 4,848,648 | A | 7/1989 | Eisman | |
| 4,903,842 | A | 2/1990 | Tokuda | |
| 4,943,456 | A | 7/1990 | Pollart | |
| 4,944,451 | A | 7/1990 | Forbes, Jr. | |
| 5,000,374 | A | 3/1991 | Deiger | |
| 5,002,826 | A | 3/1991 | Pollart | |
| 5,002,833 | A | 3/1991 | Kinsey, Jr. | |
| 5,009,939 | A | 4/1991 | Goldberg | |
| 5,118,747 | A | 6/1992 | Pollart | |
| D332,393 | S | 1/1993 | Boone | |
| 5,203,491 | A | 4/1993 | Marx | |
| D339,522 | S | 9/1993 | Zoss | |
| 5,253,801 | A | 10/1993 | Bernstein | |
| 5,326,021 | A | 7/1994 | Farrell | |
| 5,351,879 | A | 10/1994 | Liu | |
| 5,356,070 | A | 10/1994 | Rigby | |
| 5,410,135 | A | 4/1995 | Pollart | |
| 5,412,187 | A | 5/1995 | Walters | |
| D363,192 | S | 10/1995 | Reeves | |
| 5,484,052 | A | 1/1996 | Pawloski | |
| D367,172 | S | 2/1996 | Brightbill | |
| 5,530,231 | A | 6/1996 | Walters | |
| D372,170 | S | 7/1996 | Ahern, Jr. | |
| 5,533,622 | A | 7/1996 | Stockley, III | |
| 5,533,623 | A | 7/1996 | Fischer | |
| 5,538,179 | A | 7/1996 | Cai | |
| 5,588,583 | A | 12/1996 | Cargile, Jr. | |
| 5,647,168 | A | 7/1997 | Gilbert | |
| D382,230 | S | 8/1997 | Weder | |
| 5,921,465 | A | 7/1999 | Garton | |
| D420,855 | S | 2/2000 | Hurley | |
| 6,092,687 | A | 7/2000 | Hupp | |
| 6,116,501 | A | 9/2000 | Hupp | |
| D434,276 | S | 11/2000 | Obra | |
| 6,204,492 | B1 | 3/2001 | Zeng | |
| 6,234,386 | B1 | 5/2001 | Drummond | |
| 6,237,845 | B1 | 5/2001 | Hashimoto | |
| D448,130 | S | 9/2001 | Wagner | |
| 6,433,322 | B2 | 8/2002 | Zeng | |
| 6,552,315 | B2 | 4/2003 | Zeng | |
| D482,276 | S | 11/2003 | Wang | |
| D484,364 | S | 12/2003 | Bailey | |
| 6,677,563 | B2 | 1/2004 | Lai | |
| D549,457 | S | 8/2007 | Dretzka | |
| D581,720 | S | 12/2008 | Kellermann | |
| D595,155 | S | 6/2009 | Larson | |
| D633,341 | S | 3/2011 | Smyers | |
| D643,311 | S | 8/2011 | Meyers | |
| D656,789 | S | 4/2012 | Locke | |
| D658,933 | S | 5/2012 | Woodard | |
| 8,297,437 | B2 | 10/2012 | Smalley | |
| D688,572 | S | 8/2013 | Marin | |
| D688,921 | S | 9/2013 | Miros | |
| 8,534,460 | B2 | 9/2013 | Wnek | |
| D693,180 | S | 11/2013 | Peterson | |
| 8,740,051 | B2 | 6/2014 | Gonzalez | |
| 8,801,995 | B2 | 8/2014 | Wnek | |
| D712,153 | S | 9/2014 | Lee | |
| D713,741 | S | 9/2014 | Wilmers | |
| 9,376,231 | B2 | 6/2016 | Pinkstone | |
| 9,463,896 | B2 | 10/2016 | Fitzwater | |
| 9,783,345 | B2 | 10/2017 | Bentham | |
| 10,173,805 | B2 | 1/2019 | Waddington | |
| 10,214,315 | B2 | 2/2019 | Oliveira | |
| 10,214,334 | B2 | 2/2019 | Jones | |
| 10,232,973 | B2 | 3/2019 | Burke | |
| 10,689,147 | B2 | 6/2020 | Nikolic | |
| D897,847 | S | 10/2020 | Glassman | |
| 11,142,383 | B2 | 10/2021 | Thompson | |
| D962,008 | S | 8/2022 | Moore | |
| D964,862 | S | 9/2022 | Evans | |
| 11,434,038 | B2 | 9/2022 | Tye | |
| D970,977 | S | 11/2022 | Glupker | |
| 11,603,231 | B2 | 3/2023 | Oliveira | |
| 11,697,537 | B2 | 7/2023 | Holley, Jr. | |
| D1,005,100 | S | 11/2023 | Mondini | |
| 11,827,430 | B2 | 11/2023 | Brink | |
| 11,932,467 | B2 | 3/2024 | Ackroyd | |
| D1,042,118 | S | 9/2024 | Hithersay | |
| D1,042,122 | S | 9/2024 | Brink | |
| D1,051,657 | S | 11/2024 | Sellers | |
| D1,062,459 | S | 2/2025 | Brink | |
| 12,434,893 | B2 | 10/2025 | Loftin | |
| 2005/0031814 | A1 | 2/2005 | Dawes | |
| 2007/0116806 | A1 | 5/2007 | Parsons | |
| 2008/0035634 | A1 | 2/2008 | Zeng | |
| 2011/0174676 | A1 | 7/2011 | Stockhaus | |
| 2011/0259784 | A1 | 10/2011 | Tye | |
| 2012/0248180 | A1 | 10/2012 | White | |
| 2012/0292226 | A1 | 11/2012 | Hilbish | |
| 2013/0327819 | A1* | 12/2013 | Baker | B65D 77/2032 229/117.01 |
| 2013/0327821 | A1 | 12/2013 | Zwaga | |
| 2014/0124406 | A1 | 5/2014 | Ishikawa | |
| 2014/0183198 | A1 | 7/2014 | Slack | |
| 2014/0224866 | A1 | 8/2014 | Littlejohn | |
| 2015/0225120 | A1 | 8/2015 | Wnek | |
| 2015/0375889 | A1 | 12/2015 | Brockman | |
| 2016/0304226 | A1 | 10/2016 | Rossini | |
| 2017/0341355 | A1 | 11/2017 | Peiffer | |
| 2018/0022529 | A1 | 1/2018 | Tye | |
| 2018/0319568 | A1 | 11/2018 | Tye | |
| 2020/0047940 | A1 | 2/2020 | Tye | |

(56) References Cited

U.S. PATENT DOCUMENTS

| | | | |
|---|---|---|---|
| 2020/0047975 | A1 | 2/2020 | Tye |
| 2020/0255200 | A1 | 8/2020 | Mondini |
| 2022/0009669 | A1 | 1/2022 | Mack |
| 2022/0055789 | A1 | 2/2022 | Mero |
| 2022/0289459 | A1 | 9/2022 | Kastanek |
| 2022/0348376 | A1 | 11/2022 | Tye |
| 2024/0150067 | A1 | 5/2024 | Hithersay |
| 2024/0239580 | A1 | 7/2024 | Ahumada |
| 2024/0286790 | A1 | 8/2024 | Kavanagh |
| 2024/0359858 | A1 | 10/2024 | Smith |
| 2025/0058928 | A1 | 2/2025 | Cooke |
| 2026/0015123 | A1 | 1/2026 | Nowak |

FOREIGN PATENT DOCUMENTS

| | | | | |
|---|---|---|---|---|
| CN | 203450620 | U | | 2/2014 |
| CN | 109153482 | | | 1/2019 |
| DE | 19654230 | A1 | | 7/1998 |
| DE | 10022552 | | | 11/2001 |
| DE | 10111232 | A1 | | 9/2002 |
| EM | 8904924 | | | 3/2022 |
| EM | 0090908480001 | | | 8/2022 |
| EM | 0090908480002 | | | 8/2022 |
| EP | 0052021 | A1 | | 5/1982 |
| EP | 0052021 | B1 | | 1/1985 |
| EP | 0300809 | | | 1/1989 |
| EP | 0671332 | A1 | | 9/1995 |
| EP | 1104744 | A2 | | 6/2001 |
| EP | 1089912 | B1 | | 2/2004 |
| EP | 2441697 | | | 4/2012 |
| EP | 3431405 | A2 | | 1/2019 |
| EP | 3604154 | A2 | | 2/2020 |
| EP | 3725492 | A2 | | 10/2020 |
| EP | 3988463 | A1 | | 4/2022 |
| FR | 2133727 | | | 12/1972 |
| FR | 2406522 | | | 5/1979 |
| FR | 2826938 | | | 1/2003 |
| FR | 2933329 | | | 1/2010 |
| FR | 2975081 | A1 | | 11/2012 |
| GB | 1314148 | | | 4/1973 |
| GB | 1501764 | | | 2/1978 |
| GB | 1602625 | | | 11/1981 |
| GB | 2487765 | A | | 8/2012 |
| GB | 2550386 | A | | 11/2017 |
| JP | H0642636 | | | 2/1994 |
| JP | 2000141511 | A | | 5/2000 |
| JP | 2000190948 | A | | 7/2000 |
| JP | 2001002056 | A | | 1/2001 |
| JP | 2001096644 | A | | 4/2001 |
| JP | 2001233322 | A | | 8/2001 |
| JP | 2001233324 | A | | 8/2001 |
| JP | 2001278246 | A | | 10/2001 |
| JP | 2002347746 | A | | 12/2002 |
| JP | 2006290368 | A | | 10/2006 |
| JP | 2006298395 | A | * | 11/2006 |
| JP | 2023007887 | A | | 1/2023 |
| JP | 2023007889 | | | 1/2023 |
| JP | 2023007889 | A | * | 1/2023 |
| KR | 101539187 | B1 | | 7/2015 |
| RU | 2566318 | C2 | | 10/2015 |
| TW | M295475 | U | | 8/2006 |
| TW | M301016 | U | | 11/2006 |
| WO | 9828195 | A1 | | 7/1998 |
| WO | 9967143 | A2 | | 12/1999 |
| WO | 2003041945 | | | 5/2003 |
| WO | 2007127371 | | | 11/2007 |
| WO | 2009138786 | | | 11/2009 |
| WO | 2012049005 | A1 | | 4/2012 |
| WO | 2013002639 | | | 1/2013 |
| WO | 2014032059 | A1 | | 2/2014 |
| WO | 2014066867 | A1 | | 5/2014 |
| WO | 2015009518 | | | 1/2015 |
| WO | 2018017783 | A1 | | 1/2018 |
| WO | 2018042210 | A1 | | 3/2018 |
| WO | 2018178508 | A1 | | 10/2018 |
| WO | 2019020863 | | | 1/2019 |
| WO | 2019092323 | A1 | | 5/2019 |
| WO | 2019094057 | A1 | | 5/2019 |
| WO | 2020033350 | | | 2/2020 |
| WO | 2020033352 | | | 2/2020 |
| WO | 2021209610 | A1 | | 10/2021 |
| WO | 2023283293 | A1 | | 1/2023 |
| WO | WO-2023128768 | A1 | * | 7/2023 |
| WO | 2024097318 | A1 | | 5/2024 |

OTHER PUBLICATIONS

Compartment K&K Paper Tray 2100mi, available Apr. 28, 2023, [online], [site visited Apr. 28, 2023]. Available from internet, URL: https://goodwillretail.co.th/ehop/2-compartment-kk-paper-tray-2100ml/ (Year: 2023) 1 page.

Graphic Packaging adds PaperSealTM Shape. Date first available: Feb. 15, 2023. Site visited: May 6, 2025. Available online: https://www.paperadvance.com/sciences-innovations/paper-advancement/graphic-packaging-adds-paperseal-shape-to-multi-award-winning-tray-range.html (Year: 2023).

International Search Report and Written Opinion for PCT/US2024/042441 dated Dec. 3, 2024.

International Search Report and Written Opinion for PCT/US2025/036898 dated Nov. 4, 2025, 11 pages.

PaperSeal Original Tray, available Apr. 28, 2023, [online], [site visited Apr. 28, 2023]. Available from internet, URL: https://www.graphicpkg.com/products/paperseal-original/ (Year: 2023), 5 pages.

PaperSealTM Shape Tray for Ready-to-Eat Food. Date first available: Feb. 13, 2023. Site visited: May 6, 2025. Available online: https://www.graphicpkg.com/products/paperseal-shape-tray/ (Year: 2023).

PaperSeal™ Shape Tray for Ready-to-Eat Food. Date first available: Feb. 13, 2023. site visited: Aug. 28, 2025. Available online: https://www.graphicpkg.com/products/paperseal-shape-tray/ (Year: 2023).

Office Action (Non-Final Rejection) dated Nov. 21, 2025 for U.S. Appl. No. 18/805,998 (pp. 1-9).

Office Action (Notice of Allowance and Fees Due (PTOL-85)) dated Mar. 30, 2026 for U.S. Appl. No. 18/805,998 (pp. 1-7).

* cited by examiner

TRAY WITH MULTIPLE COMPARTMENTS

CROSS-REFERENCE TO RELATED APPLICATION

The present application claims priority to U.S. Provisional Patent Application No. 63/632,652, filed on Apr. 11, 2024.

INCORPORATION BY REFERENCE

The disclosures of each of U.S. patent application Ser. No. 17/690,204, filed on Mar. 9, 2022, U.S. patent application Ser. No. 16/532,819, filed on Aug. 6, 2019, U.S. patent application Ser. No. 16/037,425, filed Jul. 17, 2018, U.S. patent application Ser. No. 15/654,814, filed Jul. 20, 2017, and U.S. patent application Ser. No. 12/992,131, filed Feb. 11, 2011, PCT Patent Application No. PCT/GB/09/50506, filed May 13, 2009, U.S. Provisional Patent Application No. 63/452,852, filed on Mar. 17, 2023, and U.S. patent application Ser. No. 18/604,702, filed on Mar. 13, 2024, are hereby incorporated by reference for all purposes as if presented herein in their entirety.

BACKGROUND OF THE DISCLOSURE

The present disclosure relates to blanks, containers, trays, constructs, and various features and methods for forming a container from a blank. More specifically, the disclosure is generally directed to trays with multiple compartments.

SUMMARY OF THE DISCLOSURE

According to one aspect, the disclosure is generally directed to a tray for holding one or more food products, the tray comprising an upper construct, the upper construct comprising a plurality of panels comprising a flange panel and a plurality of upper side panels extending from the flange panel, and a lower construct, the lower construct comprising a plurality of panels, the plurality of panels of the lower construct comprising at least one bottom panel and a plurality of lower side panels forming a sidewall extending at least partially around an interior of the tray, the plurality of upper side panels of the upper construct are positioned in at least partial face-to-face contact with a respective lower side panel of the plurality of lower side panels of the lower construct, the plurality of panels of the lower construct further comprising a divider panel at least partially forming a divider wall forming a plurality of compartments in the interior of the tray.

According to another aspect, the disclosure is generally directed to a combination of blanks for forming a tray for holding one or more food products, the combination of blanks comprising an upper blank, the upper blank comprising a plurality of panels comprising a flange panel and a plurality of upper side panels extending from the flange panel, and a lower blank, the lower blank comprising a plurality of panels, the plurality of panels of the lower construct comprising at least one bottom panel and a plurality of lower side panels for forming a sidewall extending at least partially around an interior of the tray formed from the upper blank and the lower blank, the plurality of upper side panels of the upper construct are for being positioned in at least partial face-to-face contact with a respective lower side panel of the plurality of lower side panels of the lower blank when the tray is formed from the upper blank and the lower blank, the plurality of panels of the lower construct further comprising a divider panel for at least partially forming a divider wall forming a plurality of compartments in the interior of the tray formed from the upper blank and the lower blank.

According to another aspect, the disclosure is generally directed to a method of forming a tray for holding one or more food products, the method comprising obtaining an upper blank, the upper blank comprising a plurality of panels comprising a flange panel and a plurality of upper side panels extending from the flange panel. The method further comprises obtaining a lower blank, the lower blank comprising a plurality of panels, the plurality of panels of the lower construct comprising at least one bottom panel, a plurality of lower side panels, and a divider panel. The method further comprises positioning the plurality of lower side panels forming a sidewall extending at least partially around an interior of the tray, positioning the plurality of upper side panels in at least partial face-to-face contact with a respective lower side panel of the plurality of lower side panels, and positioning the divider panel at least partially forming a divider wall forming a plurality of compartments in the interior of the tray.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure relates generally to various aspects of containers, constructs, trays, materials, packages, elements, and articles, and methods of making such containers, constructs, trays, materials, packages, elements, and articles. Although several different aspects, implementations, and embodiments are disclosed, numerous interrelationships between, combinations thereof, and modifications of the various aspects, implementations, and embodiments are contemplated hereby. In one illustrated embodiment, the present disclosure relates to forming a container or tray for holding food items or various other articles. However, in other embodiments, the container or tray can be used to form other non-food containing articles or may be used for heating or cooking.

Trays described herein can be used for holding one or more articles such as food products, e.g., portioned retail food products that can include one or more of cookies, crackers, cakes, pastries, candies, nuts, popcorn, trail mix, gum, etc. In some embodiments, the articles can include frozen or non-frozen food products that can be provided in discrete portions, for example, chicken nuggets, French fries, onion rings, mozzarella sticks, chips, popcorn, other finger foods, etc. In embodiments, other types of articles that can include food products and/or non-food products can be placed in the tray for service to a customer. In some embodiments, such products can be contained in additional packaging and then placed in the tray. The tray could be otherwise shaped and arranged and could be used to hold other products and/or articles in similar or different environments without departing from the disclosure.

Figure 1:
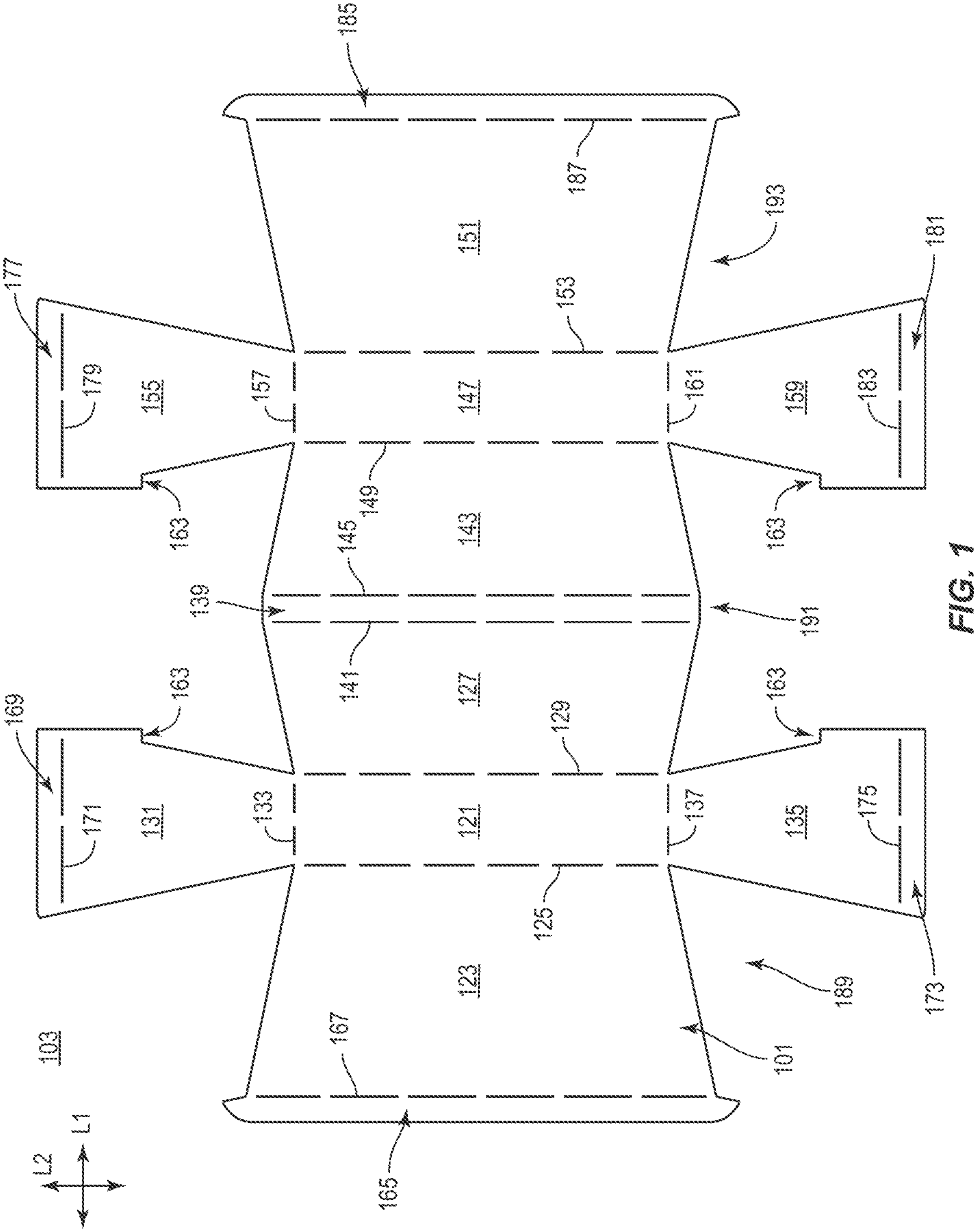
FIG. 1 is a plan view of a lower blank for forming a tray according to an exemplary embodiment of the disclosure.

FIG. 1 illustrates an exterior surface 101 of a first blank or lower blank 103 for at least partially forming a tray 105 (FIG. 3) or other container according to exemplary embodiments of the disclosure. In some embodiments, the blank 103 can be for forming a first construct or lower construct 119 of such tray 105. In one embodiment, the blank 103 comprises paperboard (e.g., solid bleached sulphate folding boxboard), or other suitable material that can be recyclable and/or suitable for use in an oven (not shown).

The blank 103 can be formed from a single ply of material, such as but not limited to paperboard, cardboard, paper, a polymeric sheet, and/or a laminate that includes more than one layer. In some embodiments, the blank 103 can include a microwave interactive layer such as is common in MicroRite® containers available from Graphic Packaging International of Atlanta, GA. The microwave interactive layer can be commonly referred to as, or can have as one of its components, a susceptor, a foil, a microwave shield, or any other term or component that refers to a layer of material suitable for shielding microwave energy and/or causing heating in a microwave oven.

As shown in FIG. 1, the blank 103 has a longitudinal direction L1 and a lateral direction L2. In the illustrated embodiment, the blank 103 and construct 119/tray 105 formed therefrom includes a plurality of panels comprising a first bottom panel 121 (broadly, "second bottom panel"), a side panel 123 (broadly, "first lower side panel" or "second lower side panel" or "third lower side panel" or "fourth lower side panel" or "fifth lower side panel" or "sixth lower side panel" or "seventh lower side panel" or "eighth lower side panel") foldably connected to the bottom panel 121 at a lateral fold line 125, a side panel 127 (broadly, "first lower side panel" or "second lower side panel" or "third lower side panel" or "fourth lower side panel" or "fifth lower side panel" or "sixth lower side panel" or "seventh lower side panel" or "eighth lower side panel") foldably connected to the bottom panel 121 at a lateral fold line 129, a side panel 131 (broadly, "first lower side panel" or "second lower side panel" or "third lower side panel" or "fourth lower side panel" or "fifth lower side panel" or "sixth lower side panel" or "seventh lower side panel" or "eighth lower side panel") foldably connected to the bottom panel 121 at a longitudinal fold line 133, and a side panel 135 (broadly, "first lower side panel" or "second lower side panel" or "third lower side panel" or "fourth lower side panel" or "fifth lower side panel" or "sixth lower side panel" or "seventh lower side panel" or "eighth lower side panel") foldably connected to the bottom panel 121 at a longitudinal fold line 137.

A divider panel 139, as shown, can be foldably connected to the side panel 127 at a lateral fold line 141, which, in turn, can be foldably connected to a side panel 143 (broadly, "first lower side panel" or "second lower side panel" or "third lower side panel" or "fourth lower side panel" or "fifth lower side panel" or "sixth lower side panel" or "seventh lower side panel" or "eighth lower side panel") at a lateral fold line 145. The side panel 143 can be foldably connected to a bottom panel 147 (broadly, "first bottom panel" or "second bottom panel") at a lateral fold line 149, and a side panel 151 (broadly, "first lower side panel" or "second lower side panel" or "third lower side panel" or "fourth lower side panel" or "fifth lower side panel" or "sixth lower side panel" or "seventh lower side panel" or "eighth lower side panel") can be foldably connected to the bottom panel 147 at a lateral fold line 153. A side panel 155 (broadly, "first lower side panel" or "second lower side panel" or "third lower side panel" or "fourth lower side panel" or "fifth lower side panel" or "sixth lower side panel" or "seventh lower side panel" or "eighth lower side panel") can be foldably connected to the bottom panel 147 at a longitudinal fold line 157, and a side panel 159 (broadly, "first lower side panel" or "second lower side panel" or "third lower side panel" or "fourth lower side panel" or "fifth lower side panel" or "sixth lower side panel" or "seventh lower side panel" or "eighth lower side panel") can be foldably connected to the bottom panel 147 at a longitudinal fold line 161. The side panels 123, 127, 131, 135, 143, 151, 155, 159 can be considered bottom side panels of the blank 103/construct 119/tray 105.

In the illustrated embodiment, the side panels 123, 127 can at least partially define free edges that have a generally oblique configuration extending longitudinally and laterally away from the respective points of intersection with the bottom panel 121. Similarly, the side panel 143, 151 can at least partially define free edges that have a generally oblique configuration extending longitudinally and laterally away from the respective points of intersection with the bottom panel 147. The divider panel 139, as shown, can at least partially define an opposed pair of generally longitudinal free edges.

Each side panel 131, 135, 155, 159, as shown, can have a generally tapered configuration that generally narrows from a longitudinal free edge thereof toward a respective bottom panel 121, 147 via respective oblique free edges. Each side panel 131, 135, 155, 159, as shown, can also include a respective notch 163 along a free edge thereof at the intersection of a respective oblique free edge and a respective shoulder.

It will be understood that one or more of the panels 121, 123, 127, 131, 135, 139, 143, 147, 151, 155, 159 can have a different configuration without departing from the disclosure.

A plurality of end flaps can be foldably connected to a respective panel of the plurality of panels of the blank 103 and construct 119/tray 105 formed therefrom. In the illustrated embodiment, a top end flap 165 can be foldably connected to the side panel 123 at a lateral fold line 167, a top end flap 169 can be foldably connected to the side panel 131 at a longitudinal fold line 171, a top end flap 173 can be foldably connected to the side panel 135 at a longitudinal fold line 175, a top end flap 177 can be foldably connected to the side panel 155 at a longitudinal fold line 179, a top end flap 181 can be foldably connected to the side panel 159 at a longitudinal fold line 183, and a top end flap 185 can be foldably connected to the side panel 151 at a lateral fold line 187.

As described further herein, the plurality of end flaps 165, 169, 173, 177, 181, 185 can be for being arranged to at least partially form a rim or flange 109 of the tray 105 when the tray 105 is formed.

As also described further herein, the plurality of panels 121, 123, 127, 131, 135, 139, 143, 147, 151, 155, 159 of the blank 103 can be for at least partially forming a plurality of compartments 111, 113 (FIG. 3) in an interior 107 of the tray 105 formed from the blank 103, the compartments 111, 113 for being at least partially separated by a divider wall 115 (FIG. 3) in the interior 107 of the tray 105.

In this regard, one or more of the panels 121, 123, 127, 131, 135 can form a first compartment forming portion 189 (broadly, "second compartment forming portion") of the blank 103 for extending at least partially around the compartment 111 of the tray 105, the divider panel 139 can form a divider forming portion 191 of the blank 103 for forming the divider wall 115 of the tray 105, and one or more of the panels 143, 147, 151, 155, 159 can form a second compartment forming portion 193 (broadly, "first compartment forming portion") of the blank 103 for extending at least partially around the compartment 113 of the tray 105.

In some embodiments, one or both of the side panels 127, 143 can additionally or alternatively form a portion of the divider forming portion 191 of the blank 103.

Figure 2:
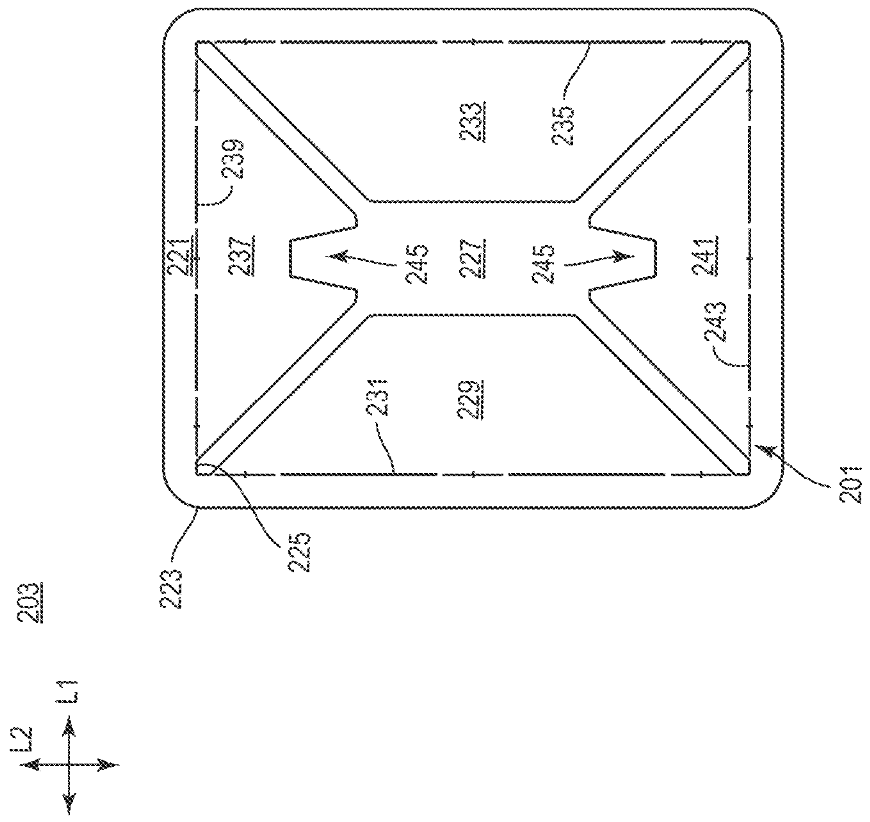
FIG. 2 is a plan view of an upper blank for forming a tray according to an exemplary embodiment of the disclosure.

Turning now to FIG. 2, the exterior surface 201 of the second blank or upper blank 203 for at least partially forming the tray 105 is illustrated according to an exemplary embodiment of the disclosure. The blank 203 can cooperate with the blank 103 to at least partially form the tray 105 such that the tray 105 can be formed from the combination of blanks 103, 203. As described further herein, the blank 203 can be for forming a second construct or upper construct 219 of the tray 105. In some embodiments, the blank 203 can be formed of a material similar to or the same as that of the blank 201.

As shown, the blank 203 has the longitudinal axis L1 and the lateral axis L2, and can include a plurality of panels that includes a top panel or rim panel or flange panel 221. The flange panel 221, as shown, can at least partially define an outer free edge 223 and an inner free edge 225 that at least partially circumscribes and at least partially defines an opening 227.

The plurality of panels of the blank 203 can also include a side attachment panel 229 (broadly, "first upper side panel", "second upper side panel", "third upper side panel", fourth upper side panel") foldably connected to the edge 225 of the flange panel 221 at a lateral fold line 231 and positioned extending into the opening 227, a side attachment panel 233 (broadly, "first upper side panel", "second upper side panel", "third upper side panel", fourth upper side panel") foldably connected to the edge 225 of the flange panel 221 at a lateral fold line 235 and positioned extending into the opening 227, a side attachment panel 237 (broadly, "first upper side panel", "second upper side panel", "third upper side panel", fourth upper side panel") foldably connected to the edge 225 of the flange panel 221 at a longitudinal fold line 239 and positioned extending into the opening 227, and a side attachment panel 241 (broadly, "first upper side panel", "second upper side panel", "third upper side panel", fourth upper side panel") foldably connected to the edge 225 of the flange panel 221 at a longitudinal fold line 243 and positioned extending into the opening 227. The panels 229, 233, 237, 241 can be considered upper side panels of the blank 203/construct 219/tray 105.

Each side attachment panel 229, 233, 237, 241, as shown, can have the general form so as to at least partially define a pair of oblique free edges that intersect a straight free edge. However, and as shown, the side attachment panels 237, 241 can have a respective recessed notch 245 at least partially defined along the straight free edge thereof, that, as described further herein, is configured to cooperate with the notches 163 of the side panels 131, 135, 155, 159 and the divider panel 139 of the blank 103/lower construct 119.

The blanks 103, 203 can, in some embodiments, be provided with a film sheet or liner 319 (FIG. 7) that comprises a plastic layer such as polyethylene, a polyethylene terephthalate (PET) material, or any other thermoplastic material, or a bioplastic, such as vegetable oil or starch based plastics. In one embodiment, such liner can comprise polyethylene that can be softened and fused to the blanks 103, 203. In an alternative embodiment, a liner for being attached to the blank 103 can comprise PET or a similar material that is at least partially attached to the blank 103 by a heat seal layer (e.g., a thermoformable sealant grade transparent polyester packaging film, such as Mylar® XMPOL12 available from DuPont Teijin Films U.S. Limited Partnership of Hopewell, Virginia, or any suitable thermoformable sealant or adhesive, any suitable heat or pressure activated adhesive, or any other suitable material), wherein a PET liner can be more suitable for uses that require heating of the container in an oven.

Such a liner can be at least partially attached to the blanks 103, 203 for being positioned in contact with one or more food products held in the tray 105 (e.g., during heating). In one embodiment, after heating the food product, the blanks 103, 203 and an accompanying liner 319 can be separated to allow both the blanks 103, 203 and the liner to be disposed of (e.g., recycled, renewed, reused, etc.) separately. Optionally, the blanks 103, 203 can be provided separately from or without the liner.

Figure 3:
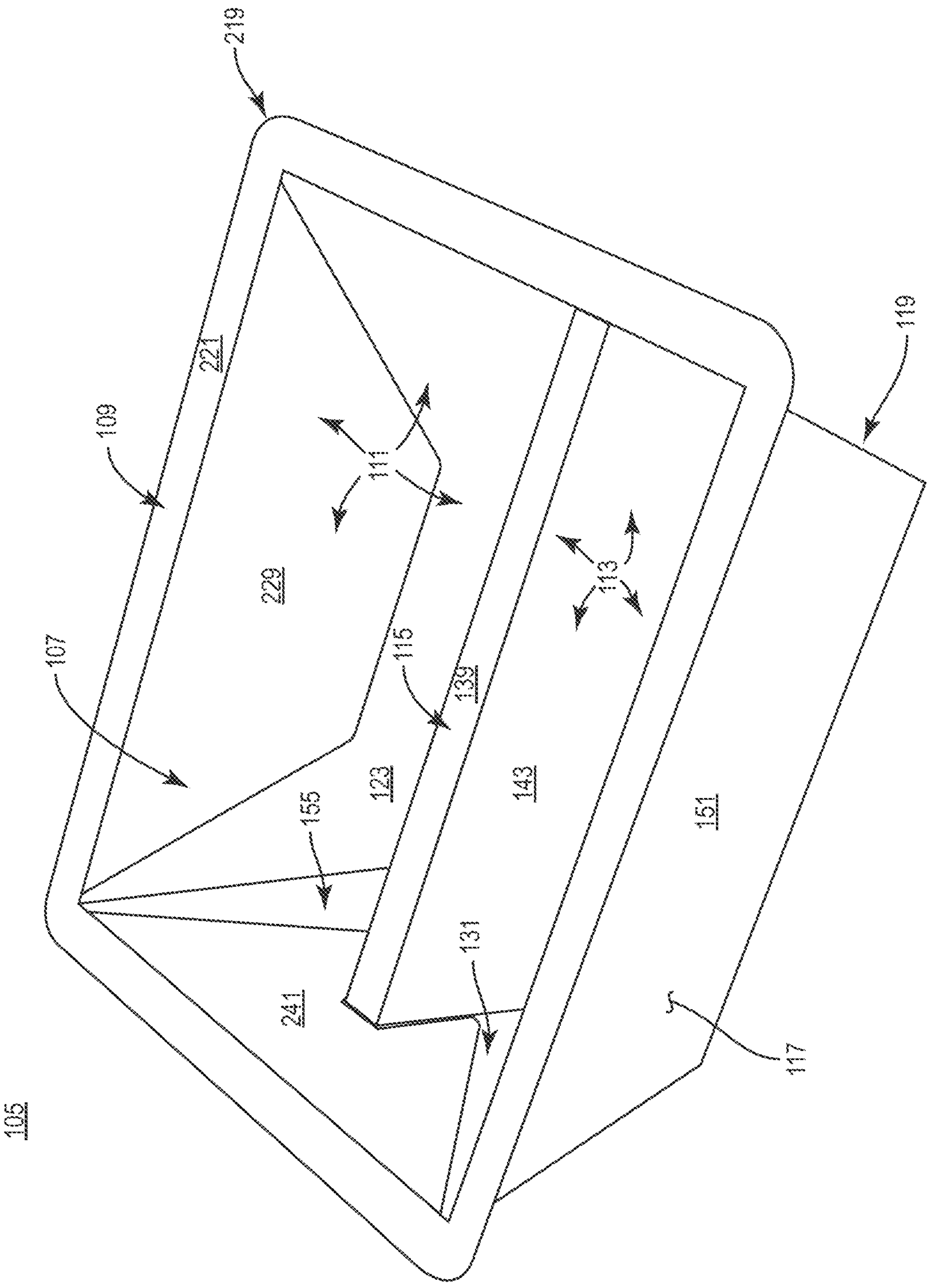
FIG. 3 is an upper perspective view of a tray formed from the blanks of FIGS. 1 and 2 according to an exemplary embodiment of the disclosure.
Figure 4:
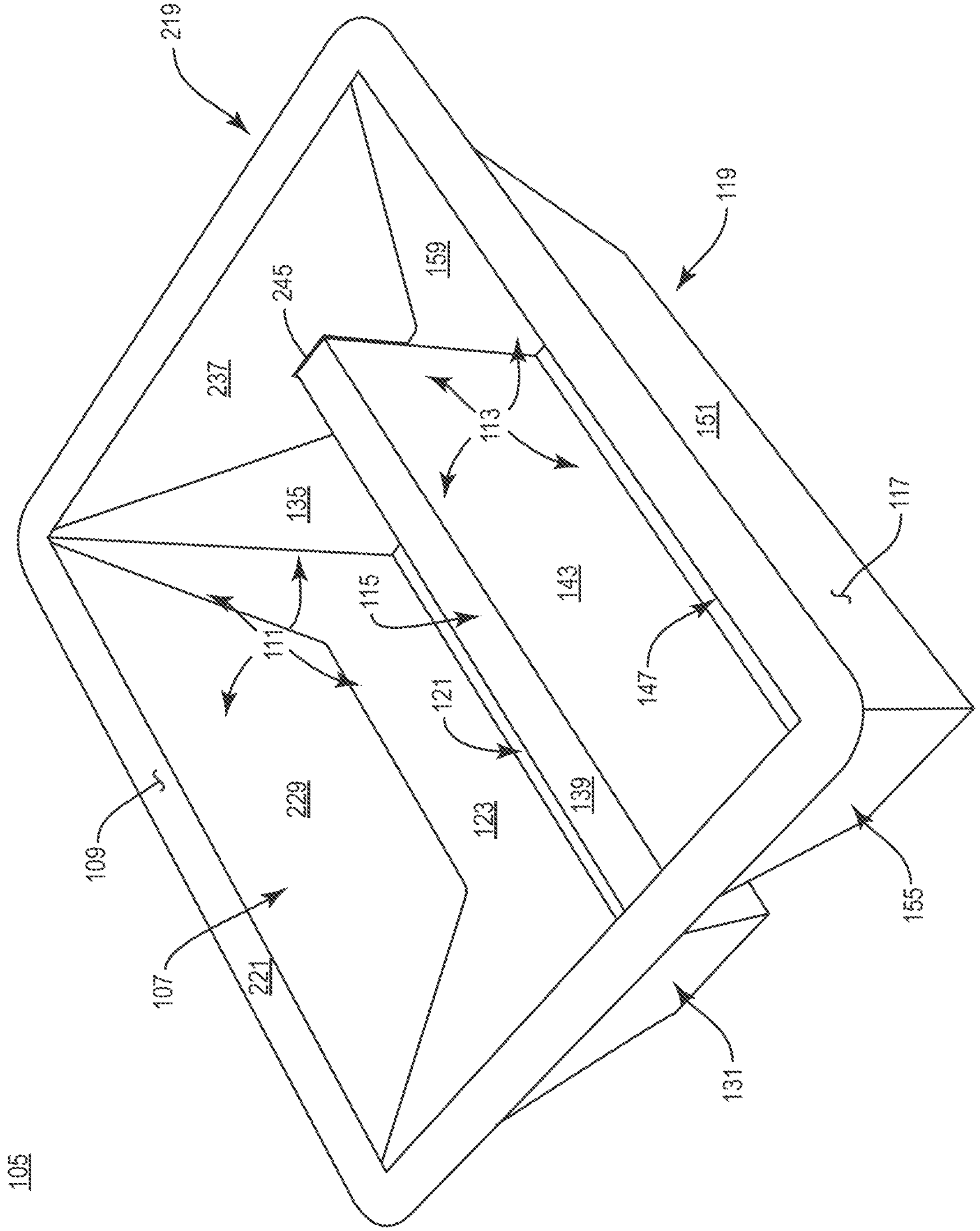
FIG. 4 is another upper perspective view of the tray of FIG. 3.
Figure 5:
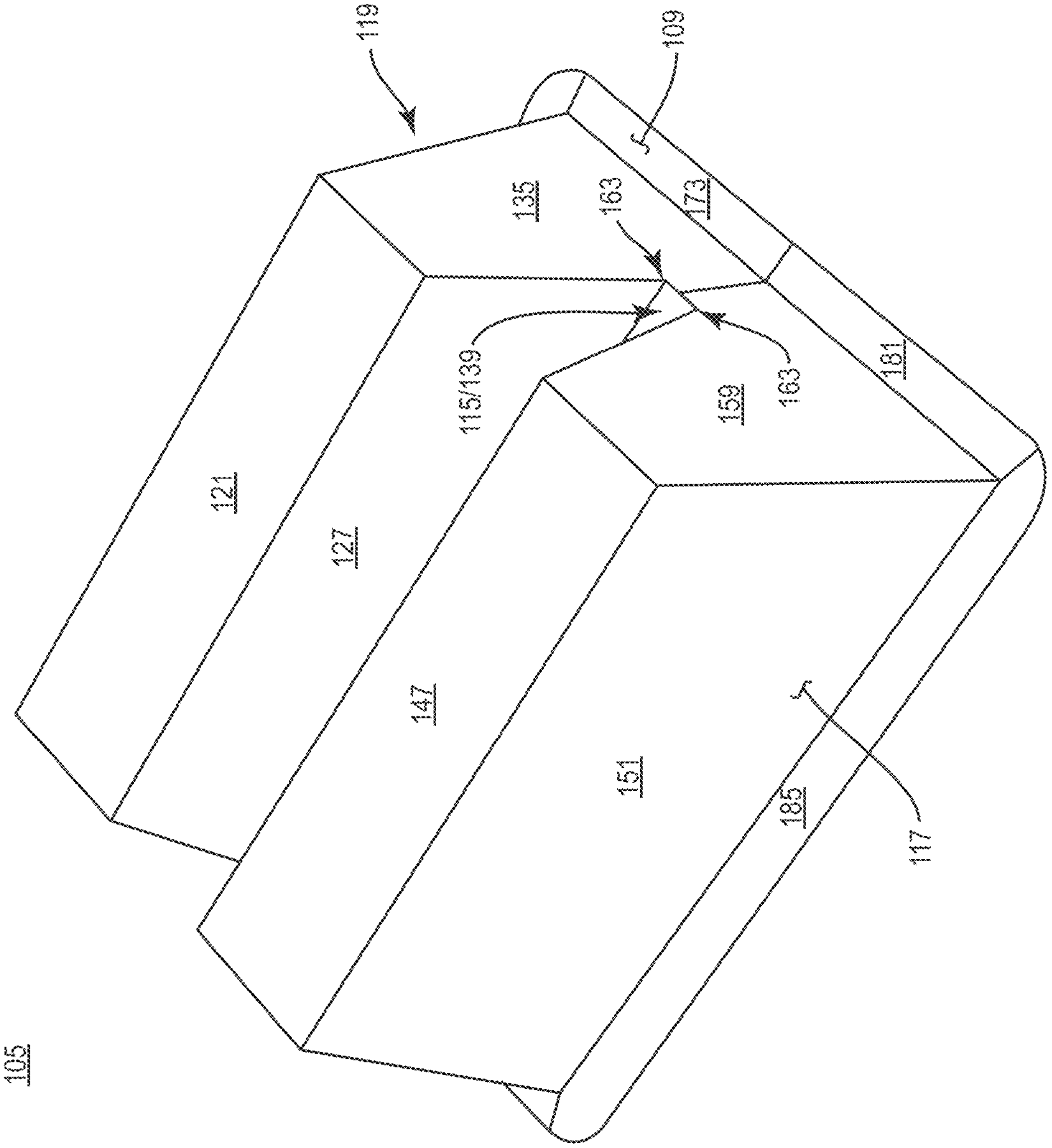
FIG. 5 is a bottom perspective view of the tray of FIG. 3.

With additional reference to FIGS. 3-5, formation of the tray 105 from the combination of the blanks 103, 203 will be described according to an exemplary embodiment of the disclosure.

The blank 103 can be positioned with the interior surface thereof (e.g., planarly opposite the exterior surface 101) facing upwardly, and with the exterior surface 101 supported on a supporting surface, e.g., table, conveyor, bedplate, etc. The side panels 127, 143 can be at least partially raised relative to the bottom panels 121, 147 via at least partial folding at the respective fold lines 129, 149 such that the side panels 127, 143 can be obliquely arranged relative to the bottom panels 121, 147. Such movement can also carry the divider panel 139 into a generally spaced and parallel relation with and above the bottom panels 121, 147.

The side panel 123 can be at least partially folded at the fold line 125 into oblique upright relation with the bottom panel 121, and the side panels 131, 135 can be at least partially folded at the respective fold lines 133, 137 into oblique upright relation with the bottom panel 121.

Similarly, the side panel 151 can be at least partially folded at the fold line 153 into oblique upright relation with the bottom panel 147, and the side panels 155, 159 can be at least partially folded at the respective fold lines 157, 161 into oblique upright relation with the bottom panel 147.

It will be understood that, in some embodiments, one or more of the side panels 123, 127, 131, 135, 143, 151, 155, 159 can be positioned in a generally perpendicularly upright orientation relative to a respective bottom panel 121, 147.

The plurality of end flaps 165, 169, 173, 177, 181, 185 can be folded at the respective fold lines 167, 171, 175, 179, 183, 187 into a generally outward arrangement, e.g. extending away from the interior 107 of the tray 105/lower construct 119 and in a generally spaced and parallel arrangement with respect to the bottom panels 121, 147.

With continued reference to FIGS. 1-5, the upper blank 203 can be placed above the lower construct 119, with the exterior surface 201 facing upwardly and the interior surface thereof facing downwardly. The flange panel 221 can be positioned over the end flaps 165, 169, 173, 177, 181, 185 such that the interior surfaces of the end flaps 165, 169, 173, 177, 181, 185 are positioned in at least partial face-to-face contact with the interior surface of the flange panel 221 to form the flange 109 of the tray 105.

The side attachment panel 229 can be folded at least partially downwardly at the fold line 231 into at least partial face-to-face contact with the side panel 123 and the side attachment panel 233 can be folded at the fold line 235 into at least partial face-to-face contact with the side panel 151.

The side attachment panel 237 can be folded at least partially downwardly at the fold line 239 into at least partial face-to-face contact with respective portions of the side panels 135, 159. Similarly, the side attachment panel 241 can be folded at least partially downwardly at the fold line 243 into at least partial face-to-face contact with respective portions of the side panels 131, 155.

The aforementioned arrangement of the tray 105 can be maintained with one or more applications of an adhesive such as glue.

In such an arrangement, the panels 121, 123, 127, 131, 135, 139, 143, 147, 151, 155, 159 can be positioned extending at least partially around an interior 107 of the tray 105/lower construct 119, with at least the panels 123, 131, 135, 151, 155, 159 forming a sidewall 117 of the tray 105/lower construct 119. In some embodiments, the sidewall 117 can include one of more of the panels 127, 139, 143. In some embodiments, the sidewall 117 can include one or both of the panels 121, 147.

The divider panel 139 can at least partially form the divider wall 115 of the tray 105, though it will be understood that one or both of the side panels 127, 143 can form a portion of the divider wall 115 of the tray 105 without departing from the disclosure.

As shown, the divider wall 115 can provide a partition or divider between a first compartment 111 in the interior 107 of the tray 105 and a second compartment 113 in the interior 107 of the tray 105. The divider wall 115 can thus maintain at least partial separation of one or more articles, e.g., food products, in the respective compartments 111, 113 in the interior 107 of the tray 105, e.g., to prevent commingling thereof, to provide convenient separate serving locations therefor, for portioning, etc.

In the illustrated embodiment, the notches 163 of the adjacent side panels 131, 155 and the notches 163 of the adjacent side panels 135, 159 can cooperate to form a recessed edge along the sidewall 117 within which the divider panel 139/divider wall 115 can be nested.

Similarly, the notches 245 of the respective side attachment panels 237, 241 can be positioned so as to at least partially receive the divider panel 139/divider wall 115 therealong.

The side attachment panels 229, 233, 237, 241 can provide reinforcement to the sidewall 117, and, in some embodiments, one or more of the side attachment panels 229, 233, 237, 241 can form a portion of the sidewall 117.

For example, one or more of the side attachment panels 229, 233, 237, 241 can provide a respective portion of the sidewall 117 with a resistance to deformation, e.g., bending, bowing, buckling, creasing, etc., by providing an additional ply of material therealong. Additionally or alternatively, the side attachment panel 237 can maintain the generally adjacent/abutting relation of the side panels 135, 159 and/or the side attachment panel 241 can maintain the generally adjacent/abutting relation of the side panels 131, 155.

It will be understood that, in some embodiments, the lower construct 119 can be formed from the blank 103 upon at least partial formation of the sidewall 117 and that the upper construct 219 can be formed from the blank 203 upon movement of the side attachment panels 229, 333, 237, 241 relative to the flange panel 221. In some embodiments, the upper construct 219 can be formed upon attachment of a respective side attachment panel 229, 233, 237, 241 to a respective panel of the plurality of panels of the lower blank 103/lower construct 119.

Figure 6:
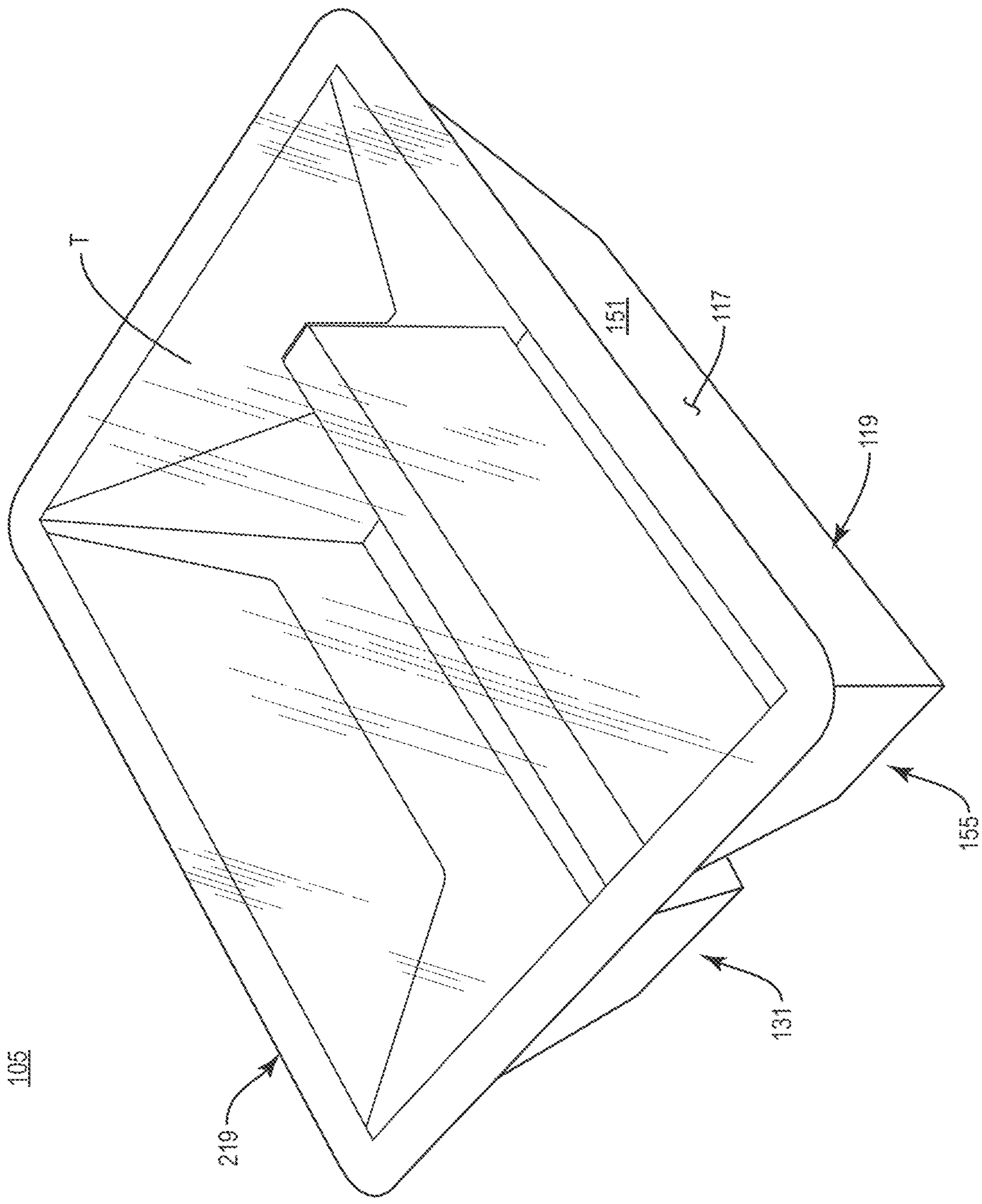
FIG. 6 is an upper perspective view of the tray of FIG. 3 provided with a lidding film.

With reference to FIG. 6, in some embodiments, a lid/lid structure such as a lidding film T can comprise packaging film that is a thin plastic layer used to preserve and protect one or more articles contained in the tray 105 and can be removably attached to the flange 109 of the tray 105, e.g., defined by a portion of the flange panel 221. Such a lidding film T can cover the flange 121 of the tray 105 so as to cover the interior 107 of the tray 105. In some embodiments, a hermetic seal of the interior 107 of the tray 105 can be achieved by such engagement by a lidding film T.

Any plastic film, such as polyethylene, polypropylene, polyethylene terephthalate, polyvinylchloride, polyamide, and ethylene vinyl alcohol, or other suitable material, can be used for forming the lidding film that is sealed against the sealing surface of the flange 109/flange panel 221. Further, adhesives can be used between the lidding film and the sealing surface of the flange/central panel without departing from the disclosure.

As described above, in embodiments, a liner can be applied to at least the interior 107 of the tray 105, and can overlie seams/points of intersection between the respective panels, e.g., such that the tray 105 has leak-resistant properties. Such liner can be separably connected to one or more surfaces of the tray 105 along the interior 107 thereof, for example, so that the liner and tray 105 can be separately disposed of after use.

In this regard, the separable arrangement of the tray 105 and the liner can facilitate the separate reuse, renewal, recycling, etc. of the paperboard material that forms the tray 105 and the polymeric material that forms the liner, without commingling thereof.

In some embodiments, a tray 105 can be provided with both a lidding film T and a liner.

In some embodiments, the tray 105 can be formed similarly to the formation of the containers as shown and described in the incorporated-by-reference applications (e.g., the '425 application, the '814 application, and/or the '131 application).

Figure 7:
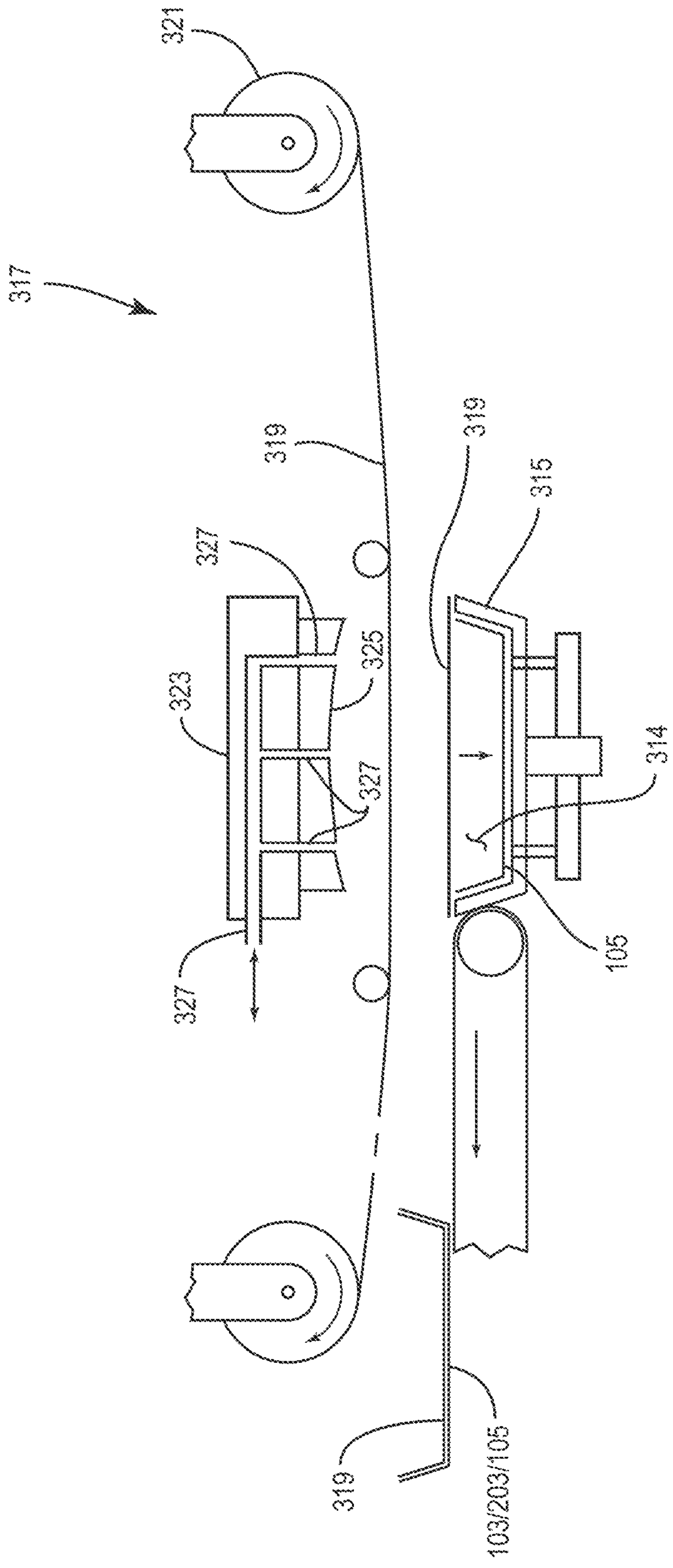
FIG. 7 is a schematic view of an apparatus for processing blanks and/or trays that can be used with exemplary embodiments of the present disclosure.

In an exemplary embodiment shown schematically in FIG. 7, the blanks 103, 203/tray 105 or a folded configuration thereof can be placed on a lower die 315 of a system 317 and a sheet of material that forms the liner 319 (e.g., a polyethylene or PET web) can be fed from a supply roller 321 above the blanks 103, 203/tray 105. An upper die 323 has a heater plate surface 325 having a PTFE coating, for example a Teflon® coating. Alternatively, the heater plate surface 325 could have a coating of any suitable material or the coating could be omitted.

As schematically shown in FIG. 7, the upper die 323 can include a plurality of holes or ducts 327 in the heater plate surface 325 for applying a vacuum and/or air pressure on the film 319. The lower die 315 and/or the upper die 323, including the ducts 327 and/or the heater plate 325, could be otherwise shaped, arranged, positioned, and/or configured without departing from the disclosure. For example, the heater plate 325 could be omitted and the heat could be alternatively applied to the film 319 (e.g., with a flow of hot air).

In the illustrated embodiment, the lower die 315 can hold the blanks 103, 203/folded blanks 103, 203 over a cavity 314 in the lower die 315 while supporting the blank 103/tray 105 at the flange panel 221 and/or the attachment panels top end flaps 165, 169, 173, 177, 181, 185 (e.g., so that the flange panel 221 is facing upwardly). An initial vacuum can be applied to ducts 327 to draw the film 319 toward the upper die 323, the upper die 323 can be heated to a suitable temperature to soften the film 319 and/or to activate a heat seal layer. Instead of, or in addition to, the initial vacuum, air pressure under the film 319 can be employed with similar or equal effect. Subsequently, the film 319 can be forced downwardly (e.g., by air pressure applied by the ducts 327 and/or a vacuum applied from below the blank 103/tray 105).

The air pressure can move the liner 319 toward the blank 103/tray 105 and the lower die 315 can support the blanks 103, 203/tray 105 as the film 319 is applied to portions of one or more of the panels 121, 123, 127, 131, 135, 139, 143, 147, 151, 155, 159, 229, 233, 237, 241. In some embodiments, the liner 319 can additionally be applied to the flange panel 221.

In some embodiments, the liner 319 can help retain the tray 105 in its tray shape after the liner 319 is applied to the blank 103/folded blank 103/tray 105. For example, in some embodiments, the attachment of the liner 319 to the tray 105 can at least partially maintain the position of the side attachment panels 229, 233, 237, 241 in at least partial face-to-face contact with respective panels of the lower construct 119 of the tray 105.

In some embodiments, the tray 105 can be ejected from the lower die 315 and transported away from the forming tool on a conveyor, for example.

In one embodiment, the tray 105 can be formed from the blank 103 and have the liner 319 applied thereto at a much higher rate than systems that separately form the tray 105 from the blanks 103, 203 and then place that formed tray 105 into the lower die 315. In one example, the tray 105 of the present embodiment can be formed from the blank 103 together with the liner 319 at a rate of approximately 200 trays per minute. The tray 105 could be otherwise formed without departing from the disclosure. For example, the tray 105 could be formed from the blanks 103, 203 prior to applying the liner 319 (e.g., prior to engaging the lower die 315).

It will be understood that the tray 105/one or more portions thereof can have a different configuration without departing from the disclosure.

Any of the features of the various embodiments of the disclosure can be combined with, replaced by, or otherwise configured with other features of other embodiments of the disclosure without departing from the scope of this disclosure.

Optionally, one or more portions of the blank or other constructs described herein or contemplated hereby may be coated with varnish, clay, or other materials, either alone or in combination. The coating may then be printed over with product advertising or other information or images. The blanks or other constructs also may be selectively coated and/or printed so that less than the entire surface area of the blank or substantially the entire surface area of the blank may be coated and/or printed.

Any of the blanks, trays, or other constructs of this disclosure may optionally include one or more features that alter the effect of microwave energy during the heating or cooking of a food item that is associated with the tray or other construct. For example, the blank, tray, container, or other construct may be formed at least partially from one or more microwave energy interactive elements (hereinafter sometimes referred to as "microwave interactive elements") that promote heating, browning and/or crisping of a particular area of the food item, shield a particular area of the food item from microwave energy to prevent overcooking thereof, or transmit microwave energy towards or away from a particular area of the food item. Each microwave interactive element comprises one or more microwave energy interactive materials or segments arranged in a particular configuration to absorb microwave energy, transmit microwave energy, reflect microwave energy, or direct microwave energy, as needed or desired for a particular construct and food item.

In the case of a susceptor or shield, the microwave energy interactive material may comprise an electroconductive or semiconductive material, for example, a vacuum deposited metal or metal alloy, or a metallic ink, an organic ink, an inorganic ink, a metallic paste, an organic paste, an inorganic paste, or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide, for example, oxides of aluminum, iron, and tin, optionally used in conjunction with an electrically conductive material. Another metal oxide that may be suitable is indium tin oxide (ITO). ITO has a more uniform crystal structure and, therefore, is clear at most coating thicknesses.

Alternatively still, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

In other embodiments, the microwave energy interactive material may be carbon-based, for example, as disclosed in U.S. Pat. Nos. 4,943,456, 5,002,826, 5,118,747, and 5,410,135.

In still other embodiments, the microwave energy interactive material may interact with the magnetic portion of the electromagnetic energy in the microwave oven. Correctly chosen materials of this type can self-limit based on the loss of interaction when the Curie temperature of the material is reached. An example of such an interactive coating is described in U.S. Pat. No. 4,283,427.

The use of other microwave energy interactive elements is also contemplated. In one example, the microwave energy interactive element may comprise a foil or high optical density evaporated material having a thickness sufficient to reflect a substantial portion of impinging microwave energy. Such elements typically are formed from a conductive, reflective metal or metal alloy, for example, aluminum, copper, or stainless steel, in the form of a solid "patch" generally having a thickness of from about 0.000285 inches to about 0.005 inches, for example, from about 0.0003 inches to about 0.003 inches. Other such elements may have a thickness of from about 0.00035 inches to about 0.002 inches, for example, 0.0016 inches.

In some cases, microwave energy reflecting (or reflective) elements may be used as shielding elements where the food item is prone to scorching or drying out during heating. In other cases, smaller microwave energy reflecting elements may be used to diffuse or lessen the intensity of microwave energy. One example of a material utilizing such microwave energy reflecting elements is commercially available from Graphic Packaging International, Inc. (Atlanta, GA) under the trade name MicroRite® packaging material. In other examples, a plurality of microwave energy reflecting elements may be arranged to form a microwave energy distributing element to direct microwave energy to specific areas of the food item. If desired, the loops may be of a length that causes microwave energy to resonate, thereby enhancing the distribution effect. Microwave energy distributing elements are described in U.S. Pat. Nos. 6,204,492, 6,433,322, 6,552,315, and 6,677,563, each of which is incorporated by reference in its entirety.

If desired, any of the numerous microwave energy interactive elements described herein or contemplated hereby may be substantially continuous, that is, without substantial breaks or interruptions, or may be discontinuous, for example, by including one or more breaks or apertures that transmit microwave energy. The breaks or apertures may extend through the entire structure, or only through one or more layers. The number, shape, size, and positioning of such breaks or apertures may vary for a particular application depending on the type of construct being formed, the food item to be heated therein or thereon, the desired degree of heating, browning, and/or crisping, whether direct exposure to microwave energy is needed or desired to attain uniform heating of the food item, the need for regulating the change in temperature of the food item through direct heating, and whether and to what extent there is a need for venting.

By way of illustration, a microwave energy interactive element may include one or more transparent areas to effect dielectric heating of the food item. However, where the microwave energy interactive element comprises a susceptor, such apertures decrease the total microwave energy interactive area, and therefore, decrease the amount of microwave energy interactive material available for heating, browning, and/or crisping the surface of the food item. Thus, the relative amounts of microwave energy interactive areas and microwave energy transparent areas may be balanced to attain the desired overall heating characteristics for the particular food item.

As another example, one or more portions of a susceptor may be designed to be microwave energy inactive to ensure that the microwave energy is focused efficiently on the areas to be heated, browned, and/or crisped, rather than being lost to portions of the food item not intended to be browned and/or crisped or to the heating environment. Additionally or alternatively, it may be beneficial to create one or more discontinuities or inactive regions to prevent overheating or charring of the food item and/or the construct including the susceptor.

As still another example, a susceptor may incorporate one or more "fuse" elements that limit the propagation of cracks in the susceptor, and thereby control overheating, in areas of the susceptor where heat transfer to the food is low and the susceptor might tend to become too hot. The size and shape of the fuses may be varied as needed. Examples of susceptors including such fuses are provided, for example, in U.S. Pat. Nos. 5,412,187, 5,530,231, U.S. Patent Application Publication No. US 2008/0035634A1, published Feb. 14, 2008, and PCT Application Publication No. WO 2007/127371, published Nov. 8, 2007, each of which is incorporated by reference herein in its entirety.

Any of the features of the various embodiments of the disclosure can be combined with, replaced by, or otherwise configured with other features of other embodiments of the disclosure without departing from the scope of this disclosure. Further, it is noted that the nesting arrangements and/or the features of the blanks and cartons of the various embodiments can be incorporated into a container or blank having any container style or panel configuration. The container styles and panel configurations described above are included by way of example.

The blanks according to any of the embodiments of the present disclosure can be, for example, formed from coated paperboard and similar materials. For example, the interior and/or exterior sides of the blank can be coated with a clay coating. The clay coating may then be printed over with product, advertising, price coding, and other information or images. The blank may then be coated with a varnish to protect any information printed on the blank. The blank may also be coated with, for example, a moisture barrier layer, on either or both sides of the blank. In accordance with the above-described embodiments, the blank may be constructed of paperboard of a caliper such that it is heavier and more rigid than ordinary paper. The blank can also be constructed of other materials, such as cardboard, hard paper, or any other material having properties suitable for enabling the carton to function at least generally as described herein. The blank can also be laminated or coated with one or more sheet-like materials at selected panels or panel sections.

In accordance with the above-described embodiments of the present disclosure, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed portion in the material along the desired line of weakness; a cut that extends partially into a material along the desired line of weakness, and/or a series of cuts that extend partially into and/or completely through the material along the desired line of weakness; and various combinations of these features.

As an example, a tear line can include: a slit that extends partially into the material along the desired line of weakness, and/or a series of spaced apart slits that extend partially into and/or completely through the material along the desired line of weakness, or various combinations of these features. As a more specific example, one type of tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

The above embodiments may be described as having one or more panels adhered together by glue during erection of the carton embodiments. The term “glue” is intended to encompass all manner of adhesives commonly used to secure carton panels in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A tray for holding one or more food products, the tray comprising:

an upper construct, the upper construct comprising a plurality of panels comprising a flange panel and a plurality of upper side panels extending from the flange panel; and a lower construct, the lower construct comprising a plurality of panels, the plurality of panels of the lower construct comprising a first bottom panel at least partially forming a first compartment, a second bottom panel at least partially forming a second compartment, a divider panel forming a divider wall dividing an interior of the tray into the first compartment and the second compartment, a first lower side panel foldably connected to the first bottom panel and the divider panel, a second lower side panel foldably connected to the second bottom panel and the divider panel, a third lower side panel foldably connected to the first bottom panel, and a fourth lower side panel foldably connected to the second bottom panel, each of the third lower side panel and the fourth lower side panel having a respective lower construct notch, the first lower side panel and the second lower side panel cooperating with the divider panel to form the divider wall, the third lower side panel and the fourth lower side panel cooperating to form a sidewall extending at least partially around the interior of the tray, the lower construct notch of the third lower side panel and the lower construct notch of the fourth lower side panel cooperate to form a recessed edge of the sidewall receiving a portion of the divider wall, one of the plurality of upper side panels of the upper construct is positioned in at least partial face-to-face contact with the third lower side panel and the fourth lower side panel.

2. The tray of claim 1, wherein the one of the plurality of upper side panels has an upper construct notch cooperating with the lower construct notch of the third lower side panel and the lower construct notch of the fourth lower side panel to form the recessed edge of the sidewall receiving a portion of the divider wall.

3. The tray of claim 2, wherein the recessed edge of the sidewall receives a portion of the divider panel and is located below the flange panel.

4. The tray of claim 2, wherein the the one of the plurality of upper side panels is a first upper side panel, the plurality of upper side panels comprises a second upper side panel.

5. The tray of claim 4, wherein the plurality of panels of the lower construct further comprises a fifth lower side panel foldably connected to the first bottom panel and at least partially forming the sidewall, the second upper side panel is positioned in at least partial face-to-face contact with the fifth lower side panel.

6. The tray of claim 5, wherein the plurality of panels of the lower construct further comprises a sixth lower side panel foldably connected to the second bottom panel and at least partially forming the sidewall, the plurality of upper side panels comprising a third upper side panel, the third upper side panel is positioned in at least partial face-to-face contact with the sixth lower side panel.

7. The tray of claim 6, wherein the first compartment is at least partially formed by the first bottom panel, the first lower side panel, the third lower side panel, and the fifth lower side panel, and the second compartment is at least partially formed by the second bottom panel, the second lower side panel, the fourth lower side panel, and the sixth lower side panel.

8. The tray of claim 7, wherein the first upper side panel at least partially forms the first compartment and the second compartment.

9. The tray of claim 1, further comprising a plurality of end flaps foldably connected to a respective lower side panel of the lower construct, the flange panel overlapping the plurality of end flaps to form a flange of the tray extending outwardly from the sidewall.

10. The tray of claim 1, further comprising a liner at least partially overlapping and at least partially separable from the upper construct and the lower construct.

11. A combination of blanks for forming a tray for holding one or more food products, the combination of blanks comprising:

an upper blank, the upper blank comprising a plurality of panels comprising a flange panel and a plurality of upper side panels extending from the flange panel; and a lower blank, the lower blank comprising a plurality of panels, the plurality of panels of the lower blank comprising a first bottom panel for at least partially forming a first compartment, a second bottom panel for at least partially forming a second compartment, a divider panel for forming a divider wall dividing an interior of the tray into the first compartment and the second compartment, a first lower side panel foldably connected to the first bottom panel and the divider panel, a second lower side panel foldably connected to the second bottom panel and the divider panel, a third lower side panel foldably connected to the first bottom panel, and a fourth lower side panel foldably connected to the second bottom panel, each of the third lower side panel and the fourth lower side panel having a respective lower construct notch, the first lower side panel and the second lower side panel are for cooperating with the divider panel to form the divider wall, the third lower side panel and the fourth lower side panel are for cooperating to form a sidewall extending at least partially around the interior of the tray, the lower construct notch of the third lower side panel and the lower construct notch of the fourth lower side panel are for cooperating to form a recessed edge of the sidewall for receiving a portion of the divider wall, one of the plurality of upper side panels of the upper blank is for being positioned in at least partial face-to-face contact with the third lower side panel and the fourth lower side panel when the tray is formed from the upper blank and the lower blank.

12. The combination of blanks of claim 11, wherein the one of the plurality of upper side panels has an upper construct notch for cooperating with the lower construct notch of the third lower side panel and the lower construct notch of the fourth lower side panel to form the recessed edge of the sidewall receiving a portion of the divider wall when the tray is formed from the combination of blanks.

13. The combination of blanks of claim 12, wherein the the recessed edge of the sidewall is for receiving a portion of the divider panel and is located below the flange panel when the tray is formed from the combination of blanks.

14. The combination of blanks of claim 12, wherein the one of the plurality of upper side panels is a first upper side panel, the plurality of upper side panels comprises a second upper side panel.

15. The combination of blanks of claim 14, wherein the plurality of panels of the lower blank further comprises a fifth lower side panel foldably connected to the first bottom panel for at least partially forming the sidewall when the tray is formed from the combination of blanks, the second upper side panel is positioned in at least partial face-to-face contact with the fifth lower side panel for at least partially forming the sidewall when the tray is formed from the combination of blanks.

16. The combination of blanks of claim 15, wherein the plurality of panels of the lower blank further comprises a sixth lower side panel foldably connected to the second bottom panel for at least partially forming the sidewall when the tray is formed from the combination of blanks, the plurality of upper side panels comprising a third upper side panel, the third upper side panel is positioned in at least partial face-to-face contact with the sixth lower side panel for at least partially forming the sidewall when the tray is formed from the combination of blanks.

17. The combination of blanks of claim 16, wherein the first bottom panel, the first lower side panel, the third lower side panel, and the fifth lower side panel are for at least partially forming the first compartment when the tray is formed from the combination of blanks, and the second bottom panel, the second lower side panel, the fourth lower side panel, and the sixth lower side panel are for at least partially forming the second compartment when the tray is formed from the combination of blanks.

18. The combination of blanks of claim 16, wherein the first upper side panel is for at least partially forming the first compartment and the second compartment when the tray is formed from the combination of blanks.

19. The combination of blanks of claim 11, further comprising a plurality of end flaps foldably connected to a respective lower side panel of the lower blank, the flange panel for being positioned overlapping the plurality of end flaps to form a flange extending outwardly from the sidewall when the tray is formed from the combination of blanks.

20. The combination of blanks of claim 11, further comprising a liner for at least partially overlapping and for being at least partially separable from the upper blank and the lower blank.

21. A method of forming a tray for holding one or more food products, the method comprising:

obtaining an upper blank, the upper blank comprising a plurality of panels comprising a flange panel and a plurality of upper side panels extending from the flange panel;

obtaining a lower blank, the lower blank comprising a plurality of panels, the plurality of panels of the lower blank comprising a first bottom panel, a second bottom panel, a divider panel, a first lower side panel foldably connected to the first bottom panel and the divider panel, a second lower side panel foldably connected to the second bottom panel and the divider panel, a third lower side panel foldably connected to the first bottom panel, and a fourth lower side panel foldably connected to the second bottom panel, each of the third lower side panel and the fourth lower side panel having a respective lower construct notch;

positioning the third lower side panel and the fourth lower side panel forming a sidewall extending at least partially around an interior of the tray, the lower construct notch of the third lower side panel and the lower construct notch of the fourth lower side panel cooperate to form a recessed edge of the sidewall receiving a portion of a divider wall;

positioning one of the plurality of upper side panels in at least partial face-to-face contact with the third lower side panel and the fourth lower side panel; and positioning the divider panel, the first lower side panel, and the second lower side panel at least partially forming the divider wall forming a first compartment comprising at least the first bottom panel and a second compartment comprising at least the second bottom panel in the interior of the tray.

22. The method of claim 21, wherein the one of the plurality of upper side panels has an upper construct notch cooperating with the lower construct notch of the third lower side panel and the lower construct notch of the fourth lower side panel forming the recessed edge of the sidewall receiving a portion of the divider wall.

23. The method of claim 22, wherein the recessed edge of the sidewall receives a portion of the divider panel and is located below the flange panel.

24. The method of claim 22, wherein the one of the plurality of upper side panels is a first upper side panel, the plurality of upper side panels comprises a second upper side panel.

25. The method of claim 24, wherein the plurality of panels of the lower blank further comprises a fifth lower side panel foldably connected to the first bottom panel, and the method further comprises positioning the fifth lower side panel at least partially forming the sidewall.

26. The method of claim 25, further comprising positioning the second upper side panel of the plurality of upper side panels in at least partial face-to-face contact with the fifth lower side panel to at least partially form the sidewall.

27. The method of claim 26, wherein the plurality of panels of the lower blank further comprises a sixth lower side panel foldably connected to the second bottom panel, and the method further comprises positioning the sixth lower side panel at least partially forming the sidewall, the plurality of upper side panels comprising a third upper side panel, the method comprises positioning the third upper side panel in at least partial face-to-face contact with the sixth lower side panel at least partially forming the sidewall.

28. The method of claim 27, wherein the first compartment is at least partially formed by the first bottom panel, the first lower side panel, the third lower side panel, and the fifth lower side panel and the second compartment is at least partially formed by the second bottom panel, the second lower side panel, the fourth lower side panel, and the sixth lower side panel.

29. The method of claim 27, wherein the first upper side panel at least partially forms the first compartment and the second compartment.

30. The method of claim 21, wherein the lower blank comprises a plurality of end flaps foldably connected to a respective lower side panel of lower blank, and the method comprises positioning the flange panel overlapping the plurality of end flaps to form a flange of the tray extending outwardly from the sidewall.

31. The method of claim 21, further comprising at least partially overlapping a liner on the upper blank and the lower blank such that the liner is at least partially separable from the upper blank and the lower blank.

* * * * *